United States Patent
Glingener

(10) Patent No.: US 7,127,166 B2
(45) Date of Patent: Oct. 24, 2006

(54) METHOD FOR TRANSMITTING AT LEAST ONE FIRST AND ONE SECOND DATA SIGNAL IN POLARIZATION DIVISION MULTIPLEX IN AN OPTICAL TRANSMISSION SYSTEM

(75) Inventor: Christoph Glingener, Feldkirchen-Westerham (DE)

(73) Assignee: Siemens Aktiengesellschaft, Munich (DE)

( * ) Notice: Subject to any disclaimer, the term of this patent is extended or adjusted under 35 U.S.C. 154(b) by 690 days.

(21) Appl. No.: 10/261,880

(22) Filed: Sep. 30, 2002

(65) Prior Publication Data

US 2003/0128982 A1 Jul. 10, 2003

(30) Foreign Application Priority Data

Sep. 28, 2001 (DE) .............................. 101 47 871

(51) Int. Cl.
*H04J 14/06* (2006.01)
*H04B 10/00* (2006.01)

(52) U.S. Cl. ....................................... 398/65; 398/152
(58) Field of Classification Search ................. 398/65, 398/152
See application file for complete search history.

(56) References Cited

U.S. PATENT DOCUMENTS 6,634,808 B1 * 10/2003 Glingener .................... 398/65

FOREIGN PATENT DOCUMENTS

WO  WO 01/65754  9/2001

OTHER PUBLICATIONS

IEEE Photonics Technology Letters, vol. 4, No. 5, May 1992—"Fast Automatic Polarization Control System" Heismann et al.
IEEE Photonics Technology Letters, vol. 4, No. 4, May 1992—Optical Polarization Division Multiplexing at 4 Gb/s, Hill et al.

* cited by examiner

*Primary Examiner*—M. R. Sedighian
(74) *Attorney, Agent, or Firm*—Bell, Boyd & LLoyd LLC

(57) ABSTRACT

In an optical transmission system, a first modulated signal with a first transmission bit rate is generated at the transmitting end by modulating a first carrier signal with the first data signal, using a nonreturn to zero coding, and a second modulated signal with a second transmission bit rate is generated by modulating a second carrier signal with the second data signal, using a return to zero coding. The first and second modulated signal are polarized orthogonally with respect to one another and combined to form an optical multiplex signal and transmitted. At the receiving end, the optical multiplex signal is conducted via a polarization control element to a polarization splitter which splits the optical multiplex signal into the first and second modulated signal. The first modulated signal is converted into a first electrical signal and the second modulated signal is converted into a second electrical signal, the spectral component of the first and/or the second electrical signal is determined at the frequency corresponding to the first transmission rate and from this at least one control signal is derived for controlling the polarization control element.

10 Claims, 3 Drawing Sheets

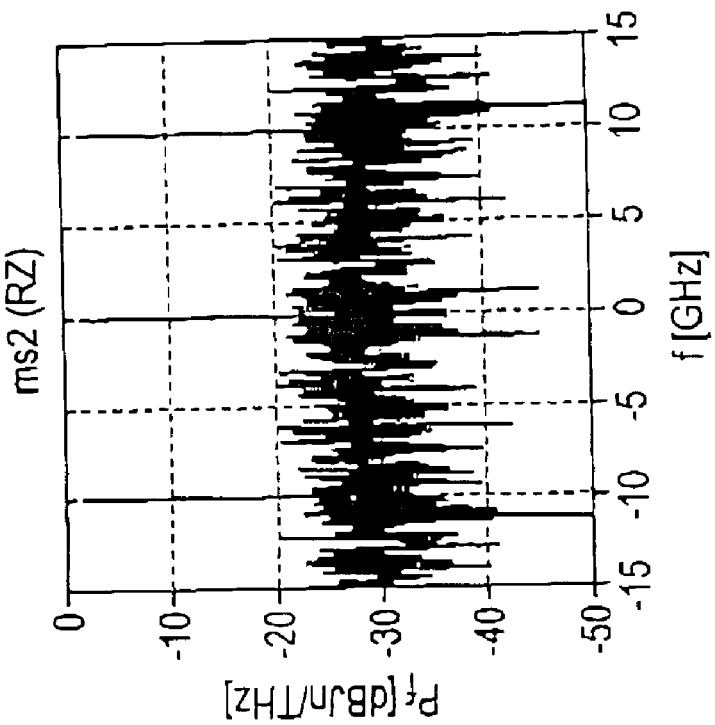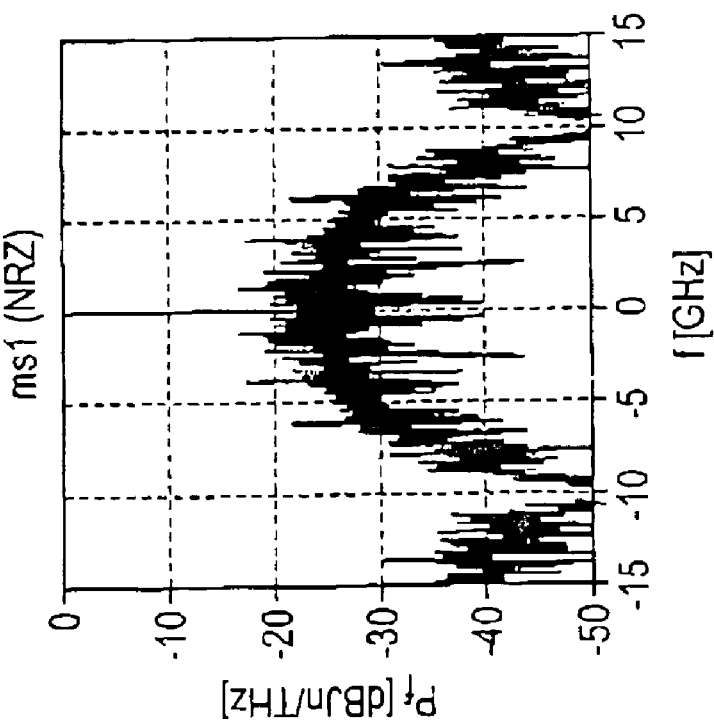

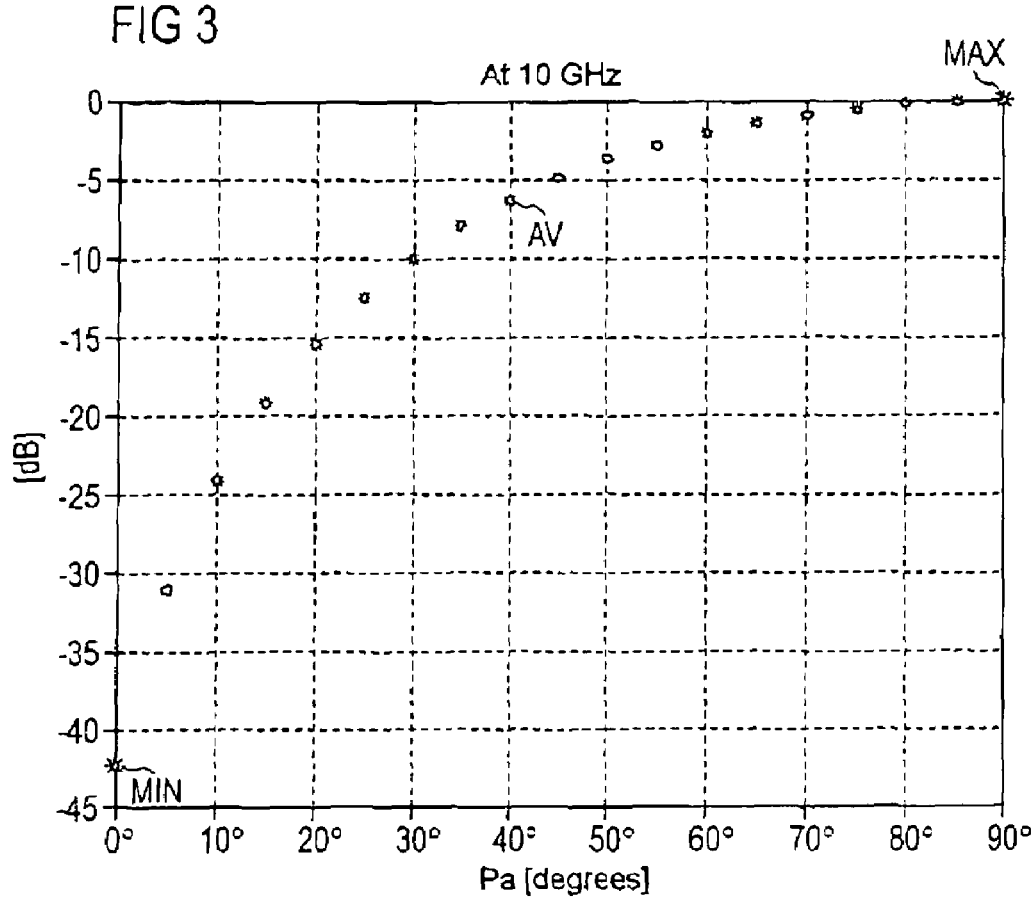

METHOD FOR TRANSMITTING AT LEAST ONE FIRST AND ONE SECOND DATA SIGNAL IN POLARIZATION DIVISION MULTIPLEX IN AN OPTICAL TRANSMISSION SYSTEM

BACKGROUND OF THE INVENTION

The present invention relates to a method for transmitting at least one first and one second data signal in polarization division multiplex in an optical transmission system which includes a transmitting arrangement and a receiving arrangement which are connected to one another via at least one optical fiber link section.

In optical transmission systems, the transmission capacity of existing optical transmission systems can be extended by transmitting the optical data signals in polarization division multiplex. To transmit optical data signals in polarization division multiplex, in each case two carrier signals which are respectively modulated with a data signal are generated in at least one transmitting arrangement with the same wavelength. The first and second modulated signals exhibit a mutually orthogonal polarization in this case. The mutually orthogonally polarized modulated signals are combined to form an optical polarization division multiplex signal. The optical polarization division multiplex signal is injected into the optical transmission fiber and transmitted via the optical transmission link to a receiving unit. At the receiving end, the two orthogonally polarized modulated signals are recovered from the polarization division multiplex signal in a wavelength-dependent and polarization-dependent manner.

One of the essential problems in transmitting optical data signals in polarization division multiplex is separating the two orthogonally polarized modulated signals precisely out of the polarization division multiplex signal. This requires the determination of a control criterion for controlling a polarization control element arranged at the receiving end from the received optical polarization division multiplex signal. The modulated signals transmitted in a mutually orthogonally polarized manner are separated with the aid of the controlled polarization transformer and, for example, a downstream polarization splitter or a polarization filter.

To control the separation of the two orthogonally polarized modulated signals at the receiving end, different control criteria are known. From the publication "Optical polarization division multiplexing at 4GB/S" by Paul M Hill et al., IEEE Photonics Technology Letters, Vol. 4, No. 5, May 1992, the use of coherent techniques in combination with pilot tones for reconstructing or, respectively, separating the polarization division multiplexed optical signals is known. Furthermore, separating the polarization division multiplexed optical data signals via a correlation signal generated from the recovered clock and from the received optical signals is known from the publication "Fast Automatic Polarization Control System", Heismann and Whalen, IEEE Photonics Technology Letters, Vol. 4, No. 5, May 1992.

Moreover, a method for separating the two signals transmitted orthogonally polarized at the receiving end via the evaluation of the autocorrelation function of one of the signals transmitted is known from international application WO 01/65754 A1. In this arrangement the control of the polarization control element at the receiving end is determined with the aid of the extinction ratio of the respective transmitted signal, calculated via the autocorrelation amount.

An object of the present invention is to devise a novel method and optical transmission system for transmitting high-bit-rate optical signals in polarization division multiplex.

SUMMARY OF THE INVENTION

A key advantage of the method according to the present invention can be seen in the fact that, to transmit at least one first and one second data signal in polarization division multiplex in an optical transmission system, in a first step, a first modulated signal with a first transmission bit rate is generated by modulating a first carrier signal with the first data signal at the transmitting end using a nonreturn to zero coding, and a second modulated signal with a second transmission bit rate is generated by modulating a second carrier signal with the second data signal, using a return to zero coding. In a second step, the first and second modulated signal are mutually orthogonally polarized and combined to form an optical multiplex signal and transmitted. In a third step, the optical multiplex signal is conducted via a polarization control element at the receiving end to a polarization splitter which splits the optical multiplex signal into the first and second modulated signal. In a fourth step, the first modulated signal is converted into a first electrical signal and the second modulated signal is converted into a second electrical signal. In a fifth step, the spectral component of the first and/or the second electrical signal is determined at the frequency corresponding to the first transmission bit rate and from this, at least one control signal is derived for controlling the polarization control element. Using the method according to the present invention, at least one polarization control element arranged at the receiving end is controlled particularly advantageously for the precise separation of a first and second modulated signal transmitted in polarization division multiplex at the receiving end. This utilizes the characteristic of the modulation process in digital signal transmission that the coding used for the modulation changes the spectrum of the modulated signal in dependence on the coding. Selecting two different codings, the nonreturn to zero (NRZ) and the return to zero (RZ) coding according to the present invention, results in different variations of the spectra for the first and second modulated signals at the frequency corresponding to the first transmission bit rate. The spectrum of the NRZ-coded modulated signal exhibits a minimum at the frequency corresponding to the first transmission bit rate whereas the RZ-coded modulated signal exhibits the same value almost over the entire spectral range. According to the present invention, the amplitude of these spectral components is evaluated for forming at least one control signal for controlling the polarization control element. In this process, the polarization control element is controlled, for example with the aid of the at least one control signal, in such a manner that the amplitude of the first electrical signal exhibits a minimum, and the amplitude of the second electrical signal exhibits a maximum, at the frequency corresponding to the first transmission bit rate. In this case, the first and second modulated signals are separated almost perfectly by the polarization splitter.

The first or second modulated signal is advantageously delayed at the transmitting end which results in effective decorrelation of the first and second modulated signals. This makes it possible additionally to increase the severity of the control criterion.

A further advantage of the present invention can be seen in the fact that, to distinguish between the first and second electrical signals, at least one pilot tone signal is superimposed on the first and/or the second carrier signal at the transmitting end. Advantageously, a pilot tone having a specified frequency, with the aid of which, after the first and second modulated signals have been separated with the aid of the polarization splitter and converted into a first and second electrical signal at the transmitting end, an unambiguous identification of the first and second electrical signals as such becomes possible, is superimposed on the first and/or second modulated signal. As an alternative, the first and second transmission bit rate can be selected to be different rates for distinguishing the first and second electrical signals. In an alternative embodiment, the respective electrical signal is advantageously identified via its individual transmission bit rate.

Additional features and advantages of the present invention are described in, and will be apparent from, the following Detailed Description of the Invention and the Figures.

BRIEF DESCRIPTION OF THE FIGURES

FIG. 2 shows, by way of example, the spectrum of the first and second modulated optical signals.

FIG. 3 shows the amplitude variation of the spectral component determined at the frequency corresponding to the first transmission bit rate in dependence on the angle of polarization.

DETAILED DESCRIPTION OF THE INVENTION

Figure 1:
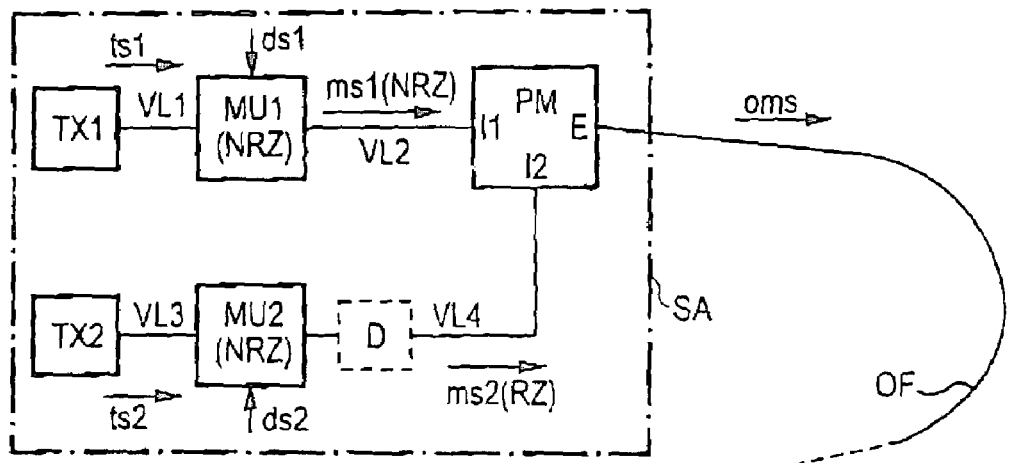
FIG. 1 shows, by way of example, an optical transmission system for transmitting at least one first and one second data signal in polarization division multiplex.
Figure 1:
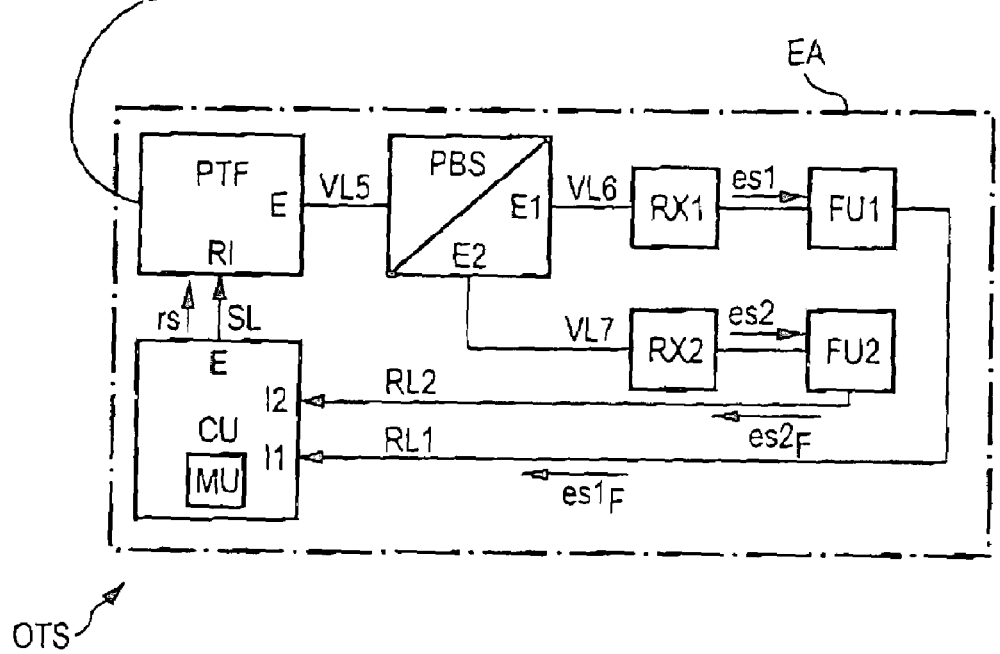

FIG. 1 diagrammatically shows, by way of example, an optical transmission system OTS which exhibits a transmitting arrangement SA and a receiving arrangement EA connected via an optical transmission link OF. In the transmitting arrangement SA, a first and second signal generating unit TX1, TX2, a first and second modulator unit MU1, MU2, a delay element D and a polarization multiplexer PM are provided, by way of example. The receiving arrangement EA includes a polarization control element PTF, a polarization splitter PBS, a first and second optoelectrical transducer RX1, RX2, a first and second filter unit FU1, FU2 and a control unit CU.

The first signal generating unit TX1 of the transmitting arrangement SA is connected via a first connecting line VL1 to the first modulator unit MU1 which is connected to the first input I1 of the polarization multiplexer PM via a second connecting line VL2. The second signal generating unit TX2 is connected via a third connecting line VL3 to the second modulator unit MU2 which is connected via a delay element D to the second input E2 of the polarization multiplexer PM by a fourth connecting line VL4. The delay element D is only provided optionally which is shown by a dashed line in FIG. 1.

The output E of the polarization multiplexer PM is connected to the input of the optical transmission link OF, the output of which is conducted to the input I of the polarization control element PTF of the receiving arrangement EA. The optical transmission link OF can consist of a number of optical transmission link sections not shown in FIG. 1 (indicated by a dashed line in FIG. 1).

The output E of the polarization control element PTF is connected via a fifth connecting line VL5 to the input I of the polarization splitter PBS, the first output E1 of which is connected to the input of the first optoelectrical transducer RX1 via a sixth connecting line VL6 and the second output E2 of which is conducted to the input of the second optoelectrical transducer RX2 via a seventh connecting line VL7. The outputs of the first and second optoelectrical transducer RX1, RX2 are conducted to the inputs of the first and second filter units FU1, FU2, respectively. The first filter unit FU1 and the second filter unit FU2 are connected, for example, via a first and a second control line RL1, RL2, respectively, to the first and second inputs I1, I2, respectively, of the control unit CU, the output E of which is connected to the control input RI of the polarization control element PTF via a control line SL. In addition, the control unit CU includes, for example, a measuring unit MU.

In the first signal generating unit TX1, a first carrier signal ts1 is generated which is conducted from the first signal generating unit TX1 to the first modulator unit MU1 via the first connecting line VL1. In addition, a first data signal ds1 is conducted to the first modulator unit MU1, via which data signal the first carrier signal ts1 is modulated by using a nonreturn zero coding NRZ and, as a result, a first modulated signal ms1 (NRZ) is generated which is directed via the second connecting line VL2 to the first input I1 of the polarization multiplexer PM. The first modulated signal ms1 (NRZ) exhibits a first transmission bit rate TR1; for example, 10 Gbit/s.

In the second signal generating unit TX2, a second carrier signal ts2 is generated. The second carrier signal ts2 is supplied to the second modulator unit MU2 via the third connecting line VL3. The second modulator unit MU2 is also supplied with a second data signal ds2 for further processing. In the second modulator unit MU2, the second carrier signal ts2 is modulated with the second data signal ds2 by using a return to zero coding RZ and, as a result, a second modulated signal ms2 (RZ) is generated which is directed to the second input I2 of the polarization multiplexer PM via the delay element D and the fourth connecting line VL4. The second modulated signal ms1 (NRZ) exhibits a second transmission bit rate TR2 which corresponds to the first transmission TR1; i.e., assumes a value of, for example, 10 Gbit/s. The first and second transmission bit rate TR1, TR2 also can be selected to be different, as a result of which the distinction between the first and second electrical signals es1, es2, separated with the aid of the polarization splitter PBS, is facilitated at the receiving end.

The second modulated signal ms2 (RZ) output at the output of the second modulator unit MU2 is delayed with the aid of the delay element D, as a result of which the first and second modulated signals ms1(NRZ), ms2(RZ) can be decorrelated at the transmitting end.

During the generation of the first and second modulated signal ms1(NRZ), ms2(RZ), the polarization is set in such a manner that these are polarized orthogonally to one another and, thus, can be transmitted in polarization division multiplex via the optical transmission link OF to the receiving arrangement EA. To orthogonalize the polarization of the first and second modulated signals ms1(NRZ), ms2(RZ), one or more polarization control elements (not shown in FIG. 1) can be provided, for example, at the receiving end. However, this is not mandatorily required, especially since optical signals with a predetermined polarization already can be generated with the aid of modern signal generating units TX1, TX2.

The first and second modulated signals ms1(NRZ), ms2 (RZ) are combined with the aid of the polarization multiplexer PM to form an optical multiplex signal oms which is injected into the optical transmission link OF at the output E of the polarization multiplexer PM. Thus, the first and second modulated signals ms1(NRZ), ms2(RZ) are transmitted in polarization division multiplex in the form of the optical multiplex signal via the optical transmission link OF.

In the receiving arrangement EA, the optical multiplex signal oms is conducted to the input I of he polarization control element PTF with the aid of which the polarization of the transmitted first and/or second modulated signal ms1(NRZ), ms2(RZ) can be controlled within the optical multiplex signal oms. After the polarization of the transmitted first and/or second modulated signal ms1(NRZ), ms2(RZ) has been set within the optical multiplex signal oms, the optical multiplex signal oms is conducted via the fifth connecting line VL5 to the input I of the polarization splitter PBS which splits the optical multiplex signal oms into the first modulated signal ms1(NRZ) and the second modulated signal ms2(RZ). The accuracy with which the optical multiplex signal oms is split into the first modulated signal ms1(NRZ) and the second modulated signal ms2(RZ) depends on the orthogonality of the polarization of the first modulated signal ms1(NRZ) and the second modulated signal ms2(RZ).

The first modulated signal ms1(NRZ) is output at the first output E1 of the polarization splitter PBS and conducted to the first optoelectrical transducer RX1 via the sixth connecting line VL6. Analogously, the second modulated signal ms2(RZ) is output at the second output E2 of the polarization splitter PBS and transmitted to the second optoelectrical transducer RX2 via the seventh connecting line VL7.

The recovered first and second modulated signals ms1(NRZ), ms2(RZ) are converted by the first and second optoelectrical transducers RX1, RX2, respectively, into a first and second electrical signal es1, es2, respectively, which are conducted to the first and second filter units FU1, FU2, respectively. Due to the different coding types, NRZ coding in the case of the first modulated signal ms1(NRZ) and RZ coding in the case of the second modulated signal ms2(RZ), in the modulation of the first and second modulated signals ms1(NRZ), ms2(RZ), their spectra have different forms at the frequency $f_M$ corresponding to the first transmission bit rate TR1, $f_M$=10 GHz in the exemplary embodiment considered. This spectral component of the first and the second electrical signal es1, es2 is determined at the frequency $f_M$ corresponding to the first transmission bit rate TR1 via the first and second filter units FU1, FU2, and the filtered first and second electrical signals $es1_F$, $es2_F$ are transmitted to the control unit CU via the first and second control lines RL1, RL2. For this purpose, the first and second filter units FU1, FU2 are designed, for example, as band-pass filters with a center frequency $f_M$ corresponding to the first transmission bit rate TR1 (for example, $f_M$=10 GHz in the exemplary embodiment considered) and a bandwidth of, for example, 1 GHz around the center frequency $f_M$.

Using the measuring unit MU, the amplitude of the filtered first and/or of the second electrical signal $es1_F$, $es2_F$ is determined in the control unit CU, and from this at least one control signal rs is derived for controlling the polarization control element PTF, which signal is conducted to the control input RI of the polarization control element PTF via the control line SL. To form the control signal rs, for example, the voltage amplitude or the current amplitude or the power amplitude of the filtered first and/or of the second electrical signal $es1_F$, $es2_F$ can be measured and evaluated.

During this process, the polarization of the optical multiplex signal oms is changed by the polarization control element PTF controlled by the control signal rs, in such a manner that the amplitude of the filtered first electrical signal $es1_F$, determined by the measuring unit MU of the control unit CU, becomes minimum and/or the amplitude of the filtered second electrical signal $es2_F$ becomes maximum. If this minimum or maximum, respectively, is reached, the receiving arrangement EA consisting of the polarization control element PTF and the polarization splitter PBS is optimally adjusted for separating the first modulated signal ms1(NRZ) and the second modulated signal ms2(RZ). Thus, a precise separation of the first and second modulated signals ms1(NRZ), ms2(RZ), transmitted in a mutually orthogonally polarized manner, becomes possible at the receiving end via the arrangement shown in FIG. 1.

In FIG. 2 a) and b), the power spectral density of the first and second modulated signals ms1(NRZ), ms2(RZ) is plotted against frequency f by way of example in two diagrams. The frequency f in [GHz] is, in each case, plotted along the abscissa of the diagrams and the power spectral density P in [dBm/THz] is, in each case, plotted along the ordinate of the diagrams. The power spectral density P of the first NRZ-coded modulated signal ms1(NRZ) is shown in FIG. 2a) and the power spectral density of the second RZ-coded modulated signal ms2(RZ) is shown in FIG. 2b). The different form of the spectrum of the first modulated signal ms1(NRZ) in comparison with the spectrum of the second modulated signal ms2(RZ) at the frequency corresponding to the first transmission bit rate, at $f_M$=10 GHz in the exemplary embodiment shown, caused by the different coding becomes clear from the variations of the spectra shown in FIG. 2a) and 2b). The power spectral density shown in FIG. 2 clearly shows that, to achieve optimal separation of the first and second modulated signals ms1(NRZ), ms2(RZ) with the aid of the controlled polarization control element PTF at the receiving end, the polarization within the optical multiplex signal oms must be set in such a way that, for example, the first filtered signal $es1_F$ assumes a minimum and/or the second filtered signal $es2_F$ becomes maximum.

FIG. 3 shows in a diagram the amplitude variation AV at a logarithmic scale [dB] of the spectral component determined, for example the power amplitude of the filtered first or second electrical signal $es1_F$, $es2_F$, at the frequency $f_M$ corresponding to the first transmission bit rate TR1 in dependence on the polarization angle pa. The polarization angle pa is plotted along the abscissa of the diagram and the amplitude P in [dB] is plotted along the ordinate. The amplitude variation AV exhibits a minimum MIN at a polarization angle of pa=0°; i.e., considering the first modulated NRZ-coded signal ms1(NRZ), the polarization is detected perfectly with a polarization shift of 0° between the first and second electrical signal es1, es2. If, however, the amplitude variation AV shown is related to the second modulated RZ-coded signal ms2(RZ), its polarization is detected perfectly with a polarization shift of 90° between the first and second electrical signals es1, es2 and, thus, at the maximum MAX shown in the amplitude variation AV. Assuming the minimum MIN and/or the maximum MAX, the first and second modulated signals ms1, ms2 transmitted in the optical modulation signal oms are ideally orthogonally polarized at the receiving end and, thus, can be separated almost perfectly with the aid of the polarization splitter PBS. All other polarization angles pa are unwanted in the control and lead to crosstalk during the separation of the first and second modulated signal ms1, ms2 at the receiving end.

Due to the delay, such as of the second modulated signal ms2, performed with the aid of the delay element D optionally provided in the transmitting arrangement SA, the amplitude variation shown in FIG. 3 becomes even more diverse, as a result of which an even more severe control signal rs can be formed in the control unit CU. For this purpose, a delay element D can be used for optionally delaying the first or the second modulated signal ms1, ms2.

In addition, both the first and the second filtered electrical signals es1$_F$, es2$_F$ can be evaluated for forming at least one control signal rs.

Moreover, additional filtering of the first and second electrical signals es1, es2 at other frequencies apart from the frequency f$_M$ corresponding to the first transmission bit rate TR1 is possible with the aid of the first and second filter units FU1, FU2 or other filter units FUx in order to obtain further information about the polarization of the first and second electrical signal es1, es2. This further information then can be processed further in order to increase the diversity of the at least one control signal rs.

To distinguish between the first and second electrical signals es1, es2, separated with the aid of the polarization splitter PBS, at the receiving end, at least one pilot tone signal can be superimposed on the first and/or the second carrier signal ts1, ts2 or the first and second modulated signals ms1, ms2 at the transmitting end. In this process, the first and second electrical signals es1, es2 are identified as such by the identification of the pilot tone signal at the receiving end and then can be processed further in a signal-related way.

Although the present invention has been described with reference to specific embodiments, those of skill in the art will recognize that changes may be made thereto without departing from the spirit and scope of the present invention as set forth in the hereafter appended claims.

The invention claimed is:

1. A method for transmitting at least one first and one second data signal in polarization division multiplex in an optical transmission system, the method comprising the steps of:
    generating a first modulated signal with a first transmission bit rate at a transmitting end by modulating a first carrier signal with the first data signal, using a nonreturn to zero coding;
    generating a second modulated signal with a second transmission bit rate by modulating a second carrier signal with the second data signal, using a return to zero coding;
    polarizing the first and second modulated signals mutually orthogonally;
    combining the polarized signals to form an optical multiplex signal;
    transmitting the optical multiplex signal;
    conducting the optical multiplex signal via a polarization control element at a receiving end to a polarization splitter;
    splitting the optical multiplex signal into the first and second modulated signals via the polarization splitter;
    converting the first modulated signal into a first electrical signal;
    converting the second modulated signal into a second electrical signal;
    determining a spectral component of at least one of the first and second electrical signals at a frequency corresponding to the first transmission bit rate; and
    deriving from the spectral component at least one control signal for controlling the polarization control element.

2. A method for transmitting at least one first and one second data signal as claimed in claim 1, wherein an amplitude of the first and the second electrical signals is determined at the frequency corresponding to the first transmission bit rate and at least one of an amplitude of the first electrical signal is controlled to a minimum and an amplitude of the second electrical signal is controlled to a maximum.

3. A method for transmitting at least one first and one second data signal as claimed in claim 1, wherein at least one of the first and the second modulated signals is delayed at the transmitting end for purposes of decorrelation.

4. A method for transmitting at least one first and one second data signal as claimed in claim 1, the method further comprising the step of superimposing at least one pilot tone signal on at least one of the first and the second carrier signal at the transmitting end in order to distinguish between the first and second electrical signals.

5. A method for transmitting at least one first and one second data signal as claimed in claim 1, the method further comprising the step of superimposing at least one pilot tone signal on at least one of the first and the second modulated signals at the transmitting end in order to distinguish between the first and second electrical signals.

6. A method for transmitting at least one first and one second data signal as claimed in claim 1, wherein the first and second transmission bit rates are selected to be different rates in order to distinguish between the first and second electrical signals.

7. An optical transmission system for transmitting at least one first and one second data signal in polarization division multiplex, comprising:
    a transmitting arrangement, including at least one signal generating unit for generating first and second carrier signals, at least one modulator unit following the generating unit for generating a first modulated signal having a first transmission bit rate by modulation with nonreturn to zero coding of the first carrier signal with the first data signal and for generating a second modulated signal having a second transmission bit rate by modulation with return to zero coding of the second carrier signal with the second data signal, the first and second modulated signals being polarized orthogonally with respect to one another, and a polarization multiplexer following the modulator unit for combining the first and second modulated and mutually orthogonally polarized signals to form an optical multiplex signal;
    a receiving arrangement connected to the transmitting arrangement via at least one optical fiber link section, the receiving arrangement including at least one polarization control element for adjusting the orthogonality of the polarization of the first and second modulated signals, a polarization splitter following the polarization control element having first and second outputs for splitting the optical multiplex signal into the first and second modulated signals, a first optical electrical transducer at the first output for converting the first modulated signal into a first electrical signal, and a second optical electrical transducer at the second output for converting the second modulated signal into a second electrical signal;
    a filter unit at at least one of the first and the second optical electrical transducers for determining the spectral component of at least one of the first and the second electrical signals at a frequency corresponding to the first transmission bit rate; and
    a control unit connected to the filter unit for forming at least one control signal from the filtered spectral component for controlling the polarization control element.

8. An optical transmission system for transmitting at least one first and one second data signal as claimed in claim 7, further comprising, for forming the at least one control signal, a measuring unit in the control unit for determining an amplitude of the filtered spectral component of at least one of the first and the second electrical signals.

9. An optical transmission system for transmitting at least one first and one second data signal as claimed in claim 7, wherein the filter unit is a band-pass filter with a central frequency corresponding to the first transmission bit rate of the first data signal.

10. An optical transmission system for transmitting at least one first and one second data signal as claimed in claim 7, further comprising other filter units at at least one of the first and the second opto-electrical transducers for determining further spectral components of at least one of the first and the second electrical signals at different frequencies which are additionally evaluated for forming the at least one control signal in the control unit.

* * * * *